United States Patent [19]

Dennis

[11] Patent Number: 5,033,292
[45] Date of Patent: Jul. 23, 1991

[54] ADAPTER FOR FACILITATING MEASUREMENTS OF VEHICLE DRIVE TRAIN COMPONENTS

[75] Inventor: David A. Dennis, Maumee, Ohio

[73] Assignee: Dana Corporation, Toledo, Ohio

[21] Appl. No.: 549,387

[22] Filed: Jul. 6, 1990

[51] Int. Cl.⁵ .......................................... G01M 19/00
[52] U.S. Cl. ..................................... 73/118.1; 33/335
[58] Field of Search ................. 73/118.1; 33/335, 340, 33/333, 343, 354

[56] References Cited

U.S. PATENT DOCUMENTS

| | | | |
|---|---|---|---|
| 2,308,808 | 1/1943 | Graham | 33/335 |
| 2,796,673 | 6/1957 | Wells | 33/180 |
| 3,438,135 | 4/1969 | Bense | 33/172 |
| 3,465,449 | 9/1969 | Wideburg et al. | 33/172 |
| 3,604,121 | 9/1971 | Hull | 33/182 |
| 4,067,114 | 1/1978 | Meyer, Jr. | 33/178 R |
| 4,141,149 | 2/1979 | George et al. | 33/178 D |
| 4,451,992 | 6/1984 | Malak | 33/412 |
| 4,790,079 | 12/1988 | Meyers | 33/517 |

Primary Examiner—Jerry W. Myracle
Attorney, Agent, or Firm—MacMillan, Sobanski & Todd

[57] ABSTRACT

An adapter for facilitating the use of a device, such as an inclinometer, for measuring the angular inclination of components in a vehicular drive train system is disclosed. The adapter includes an L-shaped bracket having a generally cylindrical head portion secured thereto. The bracket includes long and short legs, each of which are defined by parallel surfaces. The parallel surfaces of the long leg are perpendicular to the parallel surfaces of the short leg. The inclinometer may be mounted in any one of several different orientations on either of the surfaces of the long leg. The head portion has a closed end, which is secured to the bracket, and an opened, which is adapted to engage an end surface of a universal joint bearing cap. The opened end has a plurality of slots formed therein which define axial extensions. The extensions permit the adaptor to be used when the universal joint is mounted in a half round end yoke having integral end lugs.

16 Claims, 3 Drawing Sheets

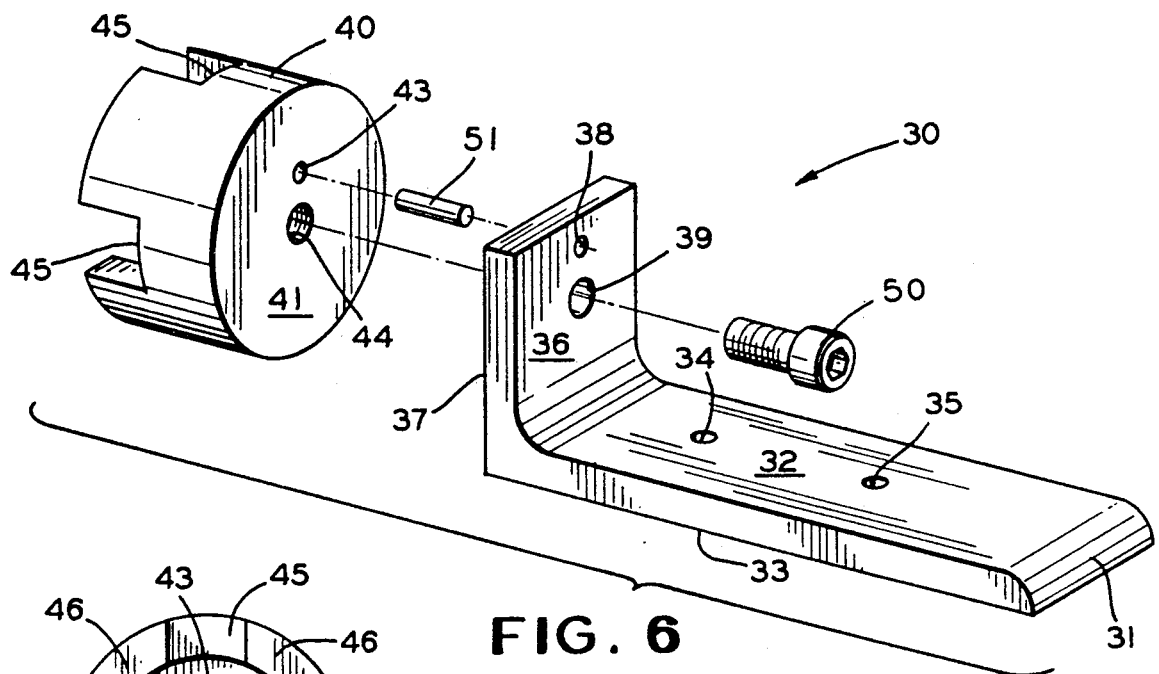
FIG. 6
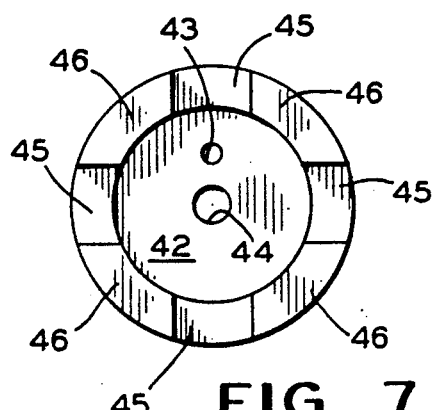
FIG. 7
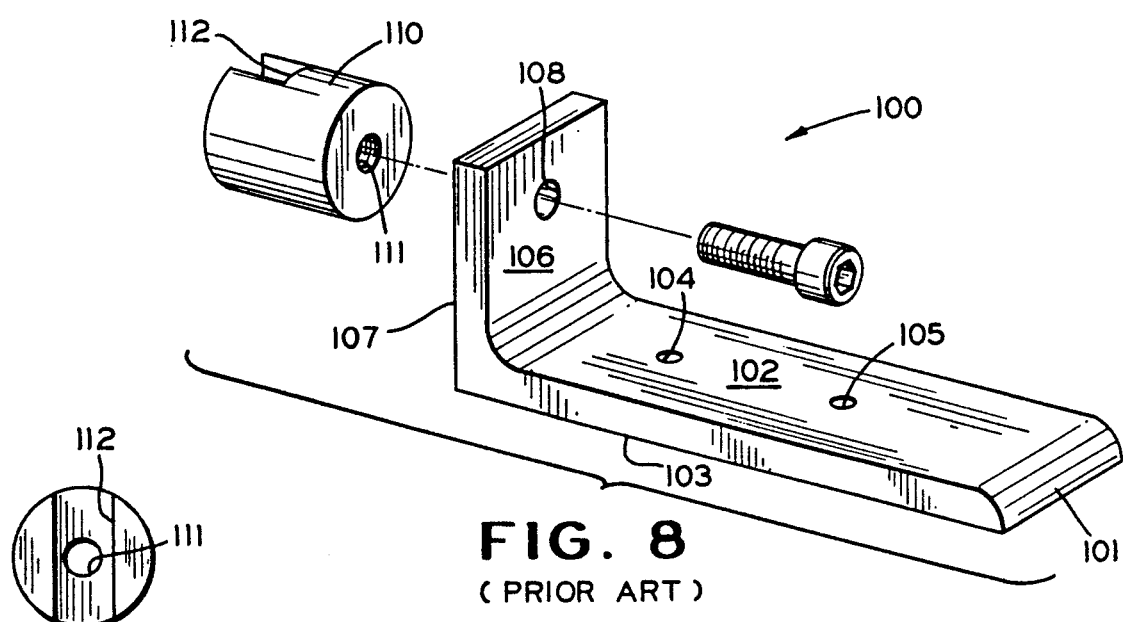
FIG. 8
(PRIOR ART)
FIG. 9
(PRIOR ART)

ADAPTER FOR FACILITATING MEASUREMENTS OF VEHICLE DRIVE TRAIN COMPONENTS

BACKGROUND OF THE INVENTION

This invention relates in general to devices for measuring the angular inclination of various components in a vehicular drive train system and in particular to an adapter for facilitating the use of such devices.

Vehicle drive train systems typically include a transmission having an output shaft connected through an elongated drive shaft to an input shaft of an axle assembly. Because of constraints imposed by the overall design of the vehicle, these shafts are rarely aligned such that their axes of rotation are co-axial. To accommodate this, and further to permit a small amount of relative movement to occur between the transmission and the axle assembly resulting from flexing of the vehicle frame during use, universal joints are usually provided between the transmission output shaft and the forward end of the drive shaft and between the rearward end of the drive shaft and the axle assembly input shaft. The universal joints permit the axes of rotation of the adjacent shafts to be angularly disposed, while providing a rotational driving connection therebetween.

The angular relationships between the transmission output shaft, the drive shaft, and the axle assembly input shaft are important factors in the proper operation of the drive train system. If the angles between these components are too large, or if the angle between the transmission output shaft and the forward end of the drive shaft is not equal to the angle between the rearward end of the drive shaft and the axle assembly input shaft, torsional vibrations may be induced. Such vibrations can cause undesirable noise and, if not corrected, premature wear and failure of the universal joints.

Accordingly, devices have been provided for measuring the angular disposition of these drive train components to determine the angular relationship therebetween. One such device is the Anglemaster inclinometer sold by Dana Corporation, the assignee of this invention. When disposed in abutting relationship against a component of the drive train, the inclinometer measures the slope thereof relative to the horizontal. The angular disposition between two adjacent components in the drive train system can be determined by measuring the relative slopes of the individual components using the inclinometer. The difference between the two slope measurements constitutes the angular disposition between the two components.

Unfortunately, the drive train components are usually located beneath the vehicle in locations which are often partially obstructed by other portions of the vehicle. Furthermore, depending upon rotational orientation of the various drive train shafts when the vehicle is parked, access to the components against which the inclinometer must be placed may also be restricted by other portions of the vehicle. Thus, in order to facilitate the taking of the measurements, it is known to provide an adapter for use with the inclinometer. Such adapter is connected to the inclinometer and is adapted to be placed against the drive train component in lieu of the inclinometer. While the known adapter has been useful in many situations, it has not been well suited for use in certain drive train assemblies, particularly those in which half round end yokes are used in the universal joints. Accordingly, it would be desirable to provide an improved adapter which is easily used on these types of drive train components.

SUMMARY OF THE INVENTION

This invention relates to an adapter for facilitating the use of a device, such as an inclinometer, for measuring the angular inclination of components in a vehicular drive train system. The adapter includes an L-shaped bracket having a generally cylindrical head portion secured thereto. The bracket includes long and short legs, each of which are defined by parallel surfaces. The parallel surfaces of the long leg are perpendicular to the parallel surfaces of the short leg. The inclinometer may be mounted in any one of several different orientations on either of the surfaces of the long leg. The head portion has a closed end, which is secured to the bracket, and an opened end, which is adapted to engage an end surface of a universal joint bearing cap. The opened end has a plurality of slots formed therein which define axial extensions. The extensions permit the adaptor to be used when the universal joint is mounted in a half round end yoke having integral end lugs.

It is an object of this invention to provide an improved adapter for facilitating the use of a device for measuring the angular inclination of various components in a vehicular drive train system.

It is another object of this invention to provide such an improved adapter which can be used in drive train systems in which the universal joints are supported in half round end yokes.

It is a further object of this invention to provide such an improved adapter which is well suited for use in limited access locations on the vehicle.

Other objects and advantages of this invention will become apparent to those skilled in the art from the following detailed description of the preferred embodiment, when read in light of the accompanying drawings.

BRIEF DESCRIPTION OF THE DRAWINGS

FIG. 6 is an exploded perspective view of the adapter shown in FIG. 3.

FIG. 7 is a left end elevational view of the head portion of the adapter shown in FIG. 6.

FIG. 8 is an exploded perspective view similar to FIG. 6 of a prior art adapter.

FIG. 9 is a left end elevational view of the head portion of the prior art adapter shown in FIG. 8.

DETAILED DESCRIPTION OF THE PREFERRED EMBODIMENT

Figure 1:
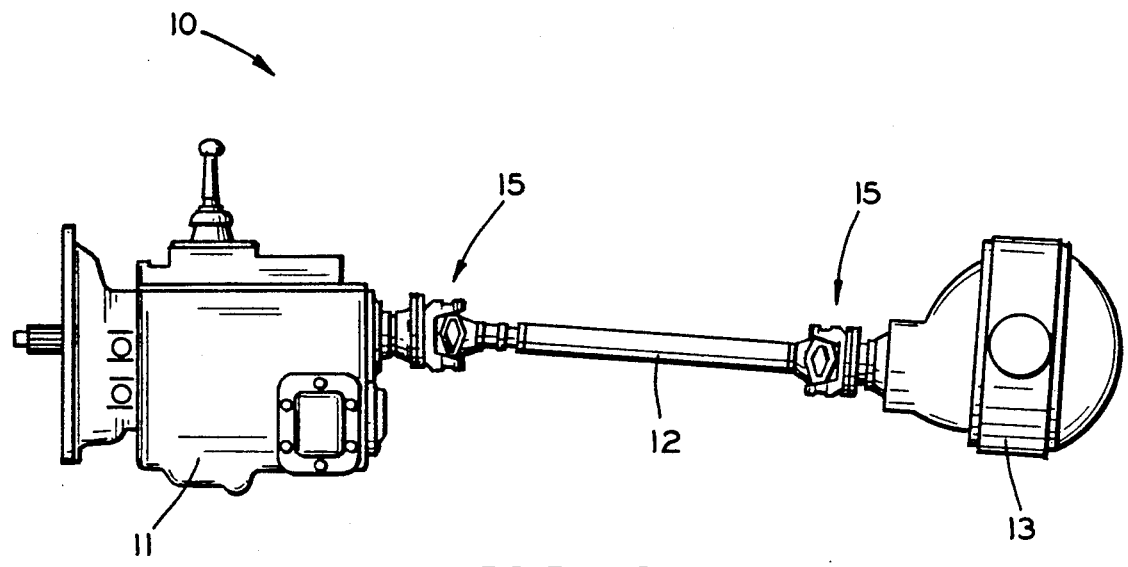
FIG. 1 is a side elevational view schematically illustrating a portion of a conventional vehicular drive train system.

Referring now to the drawings, there is illustrated in FIG. 1 a schematic view of a portion of a conventional vehicular drive train system, indicated generally at 10. The system 10 includes a transmission 11 which is connected through a drive shaft 12 to an axle assembly 13. As is typical in such a system 10, the output shaft of the transmission 11 and the input shaft of the axle assembly 13 are not co-axially aligned. Therefore, conventional universal joints, indicated generally at 15, are provided to rotatably connect the output shaft of the transmission 11 to the forward end of the drive shaft 12, and to rotatably connect the rearward end of the drive shaft 12 to the input shaft of the axle assembly 13.

Figure 2:
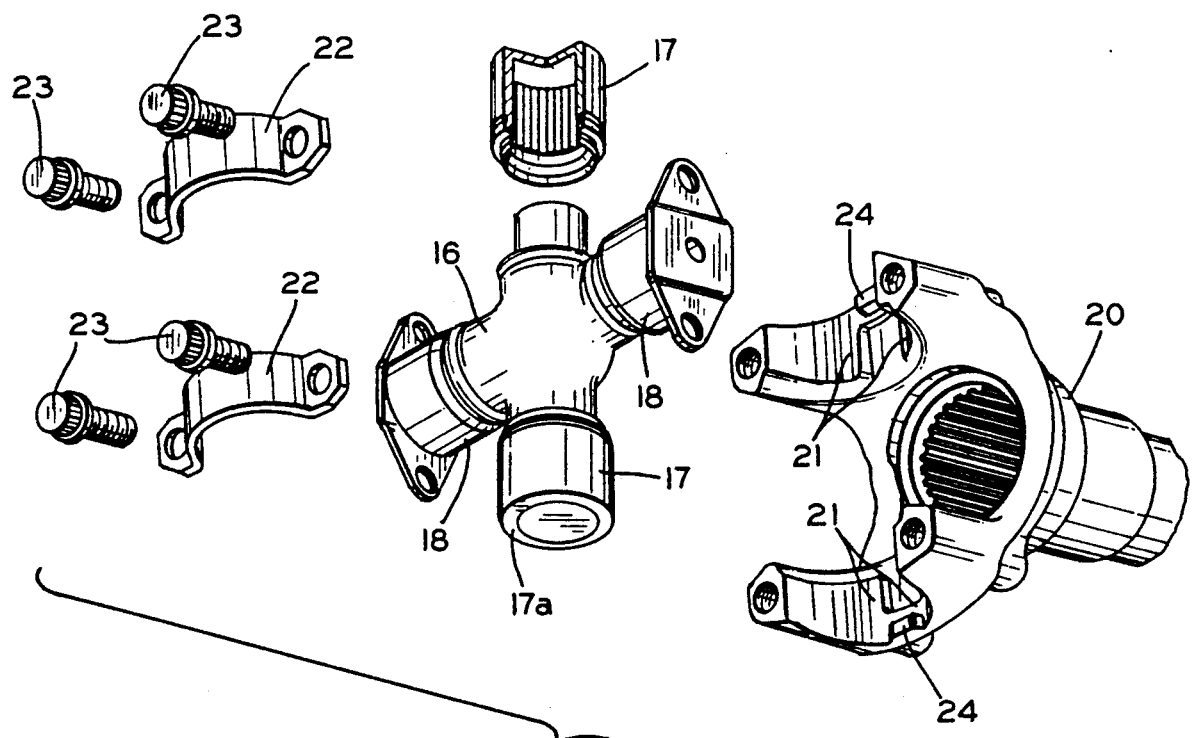
FIG. 2 is an exploded perspective view of a portion of one of the universal joints used in the drive train system illustrated in FIG. 1.
Figure 3:
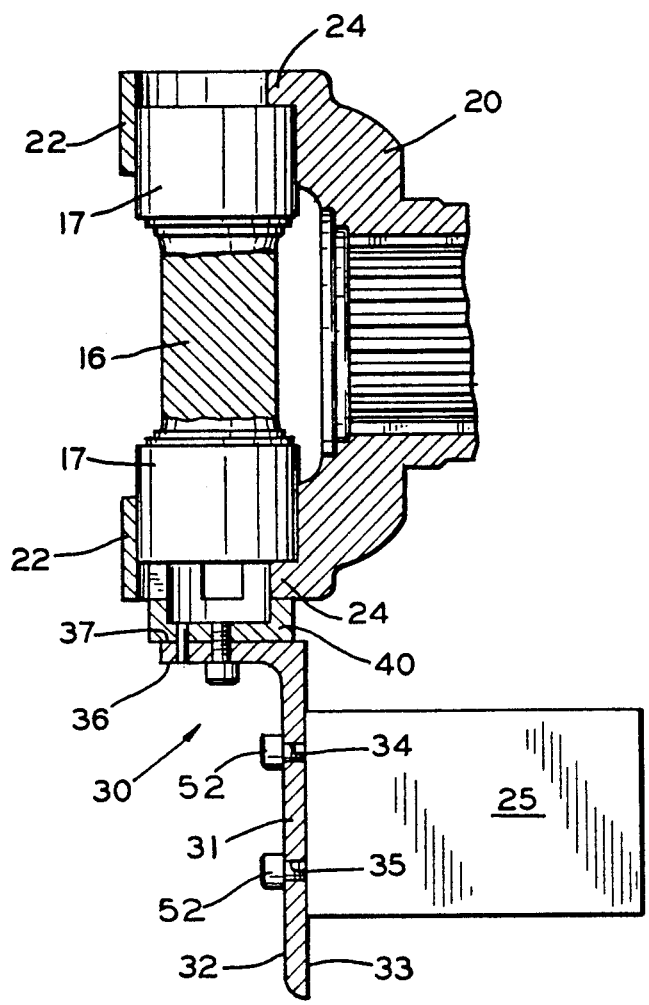
FIG. 3 is a sectional elevational view of the universal joint illustrated in FIG. 2 shown assembled in a half round end yoke and having an inclinometer mounted on an adapter in accordance with this invention.

The structure of the rearward universal joint 15 is illustrated more clearly in FIGS. 2 and 3. As shown therein, a cross 16 is provided with four outwardly extending trunnions. The trunnions extend in a common plane at right angles to one another. A first pair of bearing caps 17 are rotatably mounted on the ends of a first pair of opposed trunnions, while a second pair of bearing caps 18 are mounted on the ends of a second pair of opposed trunnions. The ends of the bearing caps 17 have annular end surfaces 17a precisely machined thereon. The purpose of these end surfaces 17a will be explained in detail below.

The universal joint 15 is connected to a half round end yoke 20 secured to the input shaft of the axle assembly 13. To accomplish this, the bearing caps 17 are disposed in bearing seats 21 formed in the arms of the half round end yoke 20. Retaining straps 22 are disposed about the bearing caps 17 and secured to the arms of the half round end yoke 20 by threaded fasteners 23. The arms of the half round end yoke 20 have end lugs 24 formed thereon for engaging and precisely positioning the end surfaces 17a of the bearing caps 17 (and, therefore, the universal joint 15) relative to the half round end yoke 20. The second pair of bearing caps 18 are adapted to be connected to a full round end yoke (not shown) connected to the rearward end of the drive shaft 12.

As discussed above, the angular relationships between the transmission output shaft 11 and the drive shaft 12 and between the drive shaft 12 and the input shaft to the axle assembly 13 are important factors in the proper operation of the drive train system 10. A conventional inclinometer 25 may be used to determine these angular relationships. In order to determine the slope of the drive shaft 12 relative to the horizontal, the inclinometer 25 is positioned in abutting relationship against the drive shaft 12. This direct engagement of the drive shaft 12 is easily accomplished since it is typically easily accessible from beneath the vehicle.

Unfortunately, the housings of the transmission 11 and the axle assembly 13 do not always provide reliable reference points for determining the slope of the shafts contained therein. Thus, the inclinometer 25 should not be positioned against these housing to measure the relative slopes of such shafts. Since the universal joints are mounted on the ends of these shafts, however, the end surfaces 17a of the bearing caps 17 can provide reliable reference points for the determining the relative slopes of the output shaft of the transmission 11 and the input shaft to the axle assembly 13. Since access to these universal joints 15 is often limited by other components of the vehicle (not shown), an adapter, indicated generally at 30, is provided for use with the inclinometer 25. As will be described in greater detail below, the adapter is placed against the end surface 17a of one of the bearing caps 17 to allow the inclinometer 25 to make accurate slope measurements of the shaft connected thereto.

As best shown in FIGS. 3, 6, and 7, the adapter 30 includes an L-shaped bracket 31 having a long leg and a short leg. The long leg of the bracket 31 is defined by a pair of precisely formed parallel surfaces 32 and 33. First and second apertures 34 and 35 are formed through the long leg. Similarly, the short leg of the bracket 31 is defined by a pair of precisely formed parallel surfaces 36 and 37. First and second apertures 38 and 39 are also formed through the short leg. The surfaces 32 and 33 of the long leg of the bracket 31 are precisely oriented at right angles to the surfaces 36 and 37 of the short leg.

The adapter 30 further includes a generally cylindrical head portion 40. The head portion 40 is generally formed in the shape of a cap having a closed end 41 and an opened end 42. First and second apertures 43 and 44 are formed through the closed end 41 of the head portion. A plurality of slots 45 are formed in the opened end 42 of of the head portion 40. The slots 45 extend axially from the opened end 42 of the head portion 40 toward the closed end 41 thereof and are oriented at ninety degrees angles relative to one another. The slots 45 define plurality of axial extensions 46 on the head portion 40, each having a generally arc-shaped cross section.

The first and second apertures 43 and 44 through the closed end 41 of the head portion 40 are sized and positioned to be aligned with the first and second apertures 38 and 39 formed through the short leg of the bracket 30. A threaded fastener 50 is provided for securing the head portion 40 to the bracket 31 to form the adapter 30. The threaded fastener 50 has an enlarged head, which abuts the surface 36 of the short leg of the bracket 31, and a shank which extends through the aperture 39 into threaded engagement with the aperture 44. By tightening the threaded fastener 50, the head portion 40 is secured to the bracket 31 for use. By loosening the threaded fastener 50, the head portion 40 may be removed from the bracket 31.

An alignment pin 51 is provided for accurately orienting the head portion 40 relative to the bracket 31. The alignment pin 51 is press fit into the aperture 43 formed through the closed end 41 of the head portion 40. When the head portion 40 is assembled onto the short leg of the bracket 31, the alignment pin 51 is snugly received within the aperture 38. By accurately locating these apertures 38 and 43, the head portion 40 can be precisely oriented relative to the bracket 31.

Figure 4:
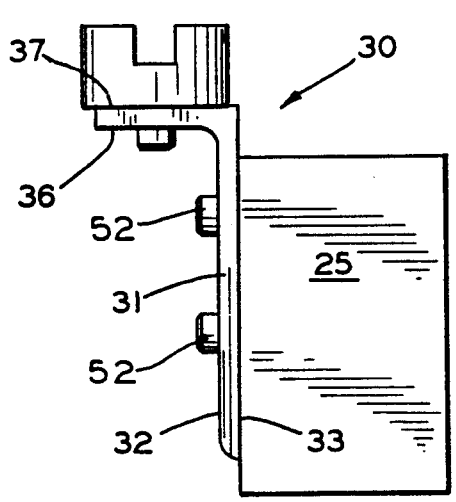
FIG. 4 is a side elevational view of the adapter shown in FIG. 3 showing the inclinometer mounted thereon in a second orientation relative thereto.
Figure 5:
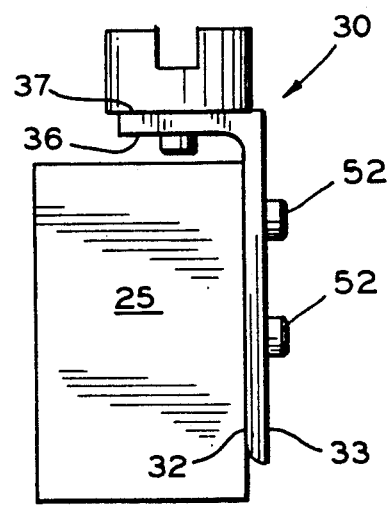
FIG. 5 is a side elevational view similar to FIG. 4 showing the inclinometer mounted thereon in a third orientation relative thereto.

In order to secure the inclinometer 25 to the bracket 31, a pair of threaded fasteners 52 are provided (see FIGS. 3, 4, and 5). The threaded fasteners 52 extend through the apertures 34 and 35 formed in the long leg of the bracket 31 into corresponding threaded apertures (not shown) formed in the housing of the inclinometer 25 to secure it thereto. As shown in FIGS. 3, 4, and 5, the inclinometer 25 may be secured to the bracket 31 in a number of different orientations. To accomplish this, two or more pairs of the threaded apertures are formed in the housing of the inclinometer 25. The particular orientation selected for use will depend upon the amount of available space beneath the vehicle for making the slope measurement.

Also, it will be appreciated that the inclinometer 25 may be rotated ninety degrees from the position illustrated in FIG. 3 to permit angular measurements to be taken in a transverse plane. Ideally, the universal joints 15 are oriented on the ends of the drive shaft 12 such that the first pair of bearing caps 17 on the forward universal joint 15 is precisely aligned with the first pair of bearing caps 17 on the rearward universal joint 15. When the universal joints 15 are so aligned, the rotational speeds thereof are exactly in phase during use. However, because of improper operation of the vehicle, the drive shaft 12 may be subjected to excessive torsional forces, causing it to twist slightly from end to end. This results in undesirable non-alignment of the universal joints 15 and consequent out-of-phase rotational speeds. By taking transverse plane measurements on both the forward and rearward universal joints 15, it can be determined if the universal joints 15 are properly aligned with one another.

To determine the relative slope of the input shaft of the axle assembly 13, for example, the inclinometer 25 is attached to the bracket 31 as shown in FIG. 3. Then, the bracket 31 is oriented such that the ends of the arc-shaped extensions 46 abut the end surface 17a of the bearing cap 17 of the rear universal joint 15. The end lugs 24 of the half round end yoke 20 are received in the slots 45 between the extensions 46 and, therefore, do not interfere with the measurement process. As mentioned above, the angular disposition of the bearing cap end surface 17a is indicative of the slope of the input shaft of the axle assembly 13. The difference between this slope measurement and the previous slope measurement of the drive shaft 12 constitutes the angular disposition therebetween.

Referring now to FIGS. 8 and 9, a prior art adapter, indicated generally at 100, is illustrated. The adapter 100 includes an L-shaped bracket 101 having a long leg and a short leg. The long leg of the bracket 101 is defined by a pair of surfaces 102 and 103. First and second apertures 104 and 105 are formed through the long leg. Similarly, the short leg of the bracket 101 is defined by a pair of surfaces 106 and 107. A single aperture 108 is formed through the short leg. The surface 103 of the long leg of the bracket 31 is precisely oriented at a right angle relative to the surface 107 of the short leg. However, the surface 102 is not formed precisely parallel to the surface 103, nor is the surface 106 formed precisely parallel to the surface 107. Thus, the inclinometer 25 can only be secured to the surface 103 in order to provide accurate measurements.

The adapter 100 further includes a generally cylindrical head portion 110. An aperture 111 is formed through one end of the head portion 110. A slot 112 is formed in the opposite end of the head portion 110. Because the head portion 110 is formed in the shape of a solid cylinder, and further because only the single slot 112 is formed in the end thereof, the inclinometer 25 cannot make the transverse plane measurements discussed above. Therefore, the inclinometer 25 cannot be used to determine whether the universal joints 15 are properly aligned with one another, as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An adapter for use with an inclinometer for measuring the angular inclination of a vehicular drive train component, the adapter comprising:
   a generally L-shaped bracket including a first leg and a second leg, said first and second legs being formed having respective surfaces, said first leg surface being precisely formed perpendicular to said second leg surface;
   means for mounting the inclinometer to said first leg surface;
   a head portion having a plurality of slots formed therein defining a plurality of extensions, said extensions adapted to engage the surface of the drive train component; and
   means for securing said head portion to said second leg surface of said bracket.

2. The invention defined in claim 1 wherein said first leg is formed having two surfaces, both of said first leg surfaces being precisely formed perpendicular to said second leg surface.

3. The invention defined in claim 2 further including means for mounting the inclinometer to either of said first leg surfaces.

4. The invention defined in claim 1 wherein said second leg is formed having two surfaces which are precisely formed parallel to one another.

5. The invention defined in claim 1 wherein said means for mounting the inclinometer includes a pair of apertures formed through said first leg.

6. The invention defined in claim 1 further including means for preventing movement of said head portion relative to said bracket when secured thereto.

7. The invention defined in claim 6 wherein said means for preventing movement includes an aperture formed in said head portion, an aperture formed in said second leg, and an alignment pin extending into said apertures.

8. The invention defined in claim 7 wherein said alignment pin is press fit into said head portion aperture.

9. An adapter for use with an inclinometer for measuring the angular inclination of a vehicular drive train component, the adapter comprising:
   a generally L-shaped bracket including a first leg and a second leg, said first and second legs being formed having respective surfaces, said first leg surface being precisely formed perpendicular to said second leg surface;
   means for mounting the inclinometer to said first leg surface;
   a head portion adapted to engage a surface of the drive train component;
   means for securing said head portion to said second leg surface of said bracket; and
   means for preventing movement of said head portion relative to said bracket when secured thereto.

10. The invention defined in claim 9 wherein said first leg is formed having two surfaces, both of said first leg surfaces being precisely formed perpendicular to said second leg surface.

11. The invention defined in claim 10 further including means for mounting the inclinometer to either of said first leg surfaces.

12. The invention defined in claim 9 wherein said second leg is formed having two surfaces which are precisely formed parallel to one another.

13. The invention defined in claim 9 wherein said means for mounting the inclinometer includes a pair of apertures formed through said first leg.

14. The invention defined in claim 9 wherein said head portion has a plurality of slots formed therein defining a plurality of extensions, said extensions adapted to engage the surface of the drive train component.

15. The invention defined in claim 9 wherein said means for preventing movement of said head portion includes an aperture formed in said head portion, an aperture formed in said second leg, and an alignment pin extending into said apertures.

16. The invention defined in claim 15 wherein said alignment pin is press fit into said head portion aperture.

* * * * *